H. C. WAITE.
TRACTION TREAD DEVICE FOR TRACTOR WHEELS.
APPLICATION FILED JAN. 25, 1915. RENEWED NOV. 14, 1917.
1,268,517.
Patented June 4, 1918.
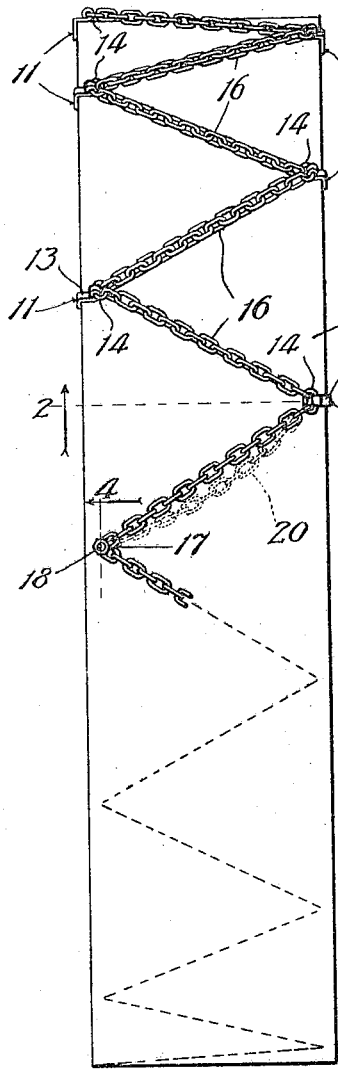
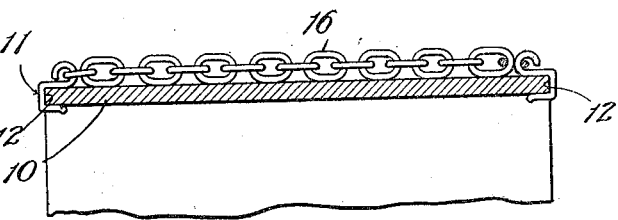
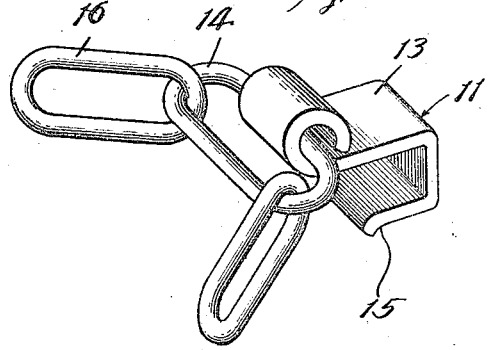
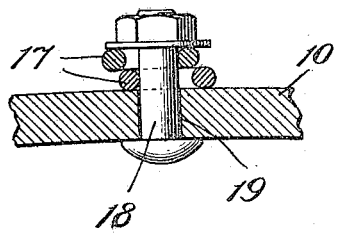
Witnesses:
Inventor:
Harry C. Waite,
By Dyrenforth, Lee, Chritton and Wiles
Attys.

UNITED STATES PATENT OFFICE.

HARRY C. WAITE, OF PIQUA, OHIO, ASSIGNOR, BY MESNE ASSIGNMENTS, TO ELGIN TRACTOR CORPORATION, A CORPORATION OF NEW YORK.

TRACTION-TREAD DEVICE FOR TRACTOR-WHEELS.

1,268,517. Specification of Letters Patent. Patented June 4, 1918.

Application filed January 25, 1915, Serial No. 4,169. Renewed November 14, 1917. Serial No. 202,069.

*To all whom it may concern:*

Be it known that I, HARRY C. WAITE, a citizen of the United States, residing at Piqua, in the county of Miami and State of Ohio, have invented a new and useful Improvement in Traction-Tread Devices for Tractor-Wheels, of which the following is a specification.

My invention relates to improvements in traction treads, and more particularly to a form of detachable traction device adapted for connection to the wheels of agricultural or road tractors. The object of the invention is to provide a simple, cheap and efficient form of traction device which may be readily applied to standard tractor wheels or driving wheels of similar design for other vehicles and for the purpose of increasing the tractive resistance of the wheel tread for pulling through sand, mud, plowed ground, and in other difficult situations. More specifically, it is the object of the invention to provide means whereby ordinary chain may be attached to form a traction tread for the wheel. I further desire to provide an attaching means for the chain which will permit of a certain movement of the chain relative to the wheel in order to prevent the chain from caking up or clogging with mud. With the above and other objects in view I have designed a form of chain-attaching means more fully described in the following specification and illustrated in the accompanying drawings in which—

Figure 1 is an elevation of a tractor wheel having my chain attached to the tread surface thereof. Fig. 2 is a section on the line 2 of Fig. 1. Fig. 3 is a perspective view of one of the attaching hooks showing the method of securing the chain thereto, and Fig. 4 is an enlarged detail section on the line 4 of Fig. 1.

Referring more particularly to the drawings, the numeral 10 designates the rim or tread of a tractor wheel of common design. In order to apply my chain-traction device thereto, I provide a plurality of flattened hooks of the form shown in Fig. 3, and designated generally by the numeral 11. These hooks are preferably formed of heavy plate or sheet-metal bent into a U-shaped form to embrace the edge 12 of the wheel rim and having the long arm 13 rolled over to secure a plain, oval chain-link, as shown in Fig. 3, and designated 14. The shorter leg of the U may be slightly out-turned, as shown at 15, for convenience in applying the hooks to the edge of the rim. A length of chain, designated 16, will be provided at equal distances along its length with the hooks 13 secured, as shown in Fig. 3, and for applying such chain to the wheel of the tractor these hooks will be alternately slipped over the opposite edges of the wheel rim in the manner shown in Fig. 1, so that the chain extends diagonally backward and forward or criss-cross, and completely around the circumference of the wheel. The free ends of the chain, designated 17, may be brought together and secured as by a single bolt 18 passing through a drilled opening 19 in the wheel rim.

By the simple construction illustrated and described above, I am able to form a very efficient traction device readily attachable to any standard tractor wheel. In the operation of the tractor, the chain 16 will sink into the road surface and grip the latter, and if there is any tendency for the tractor wheel to slip, the immediate and primary result will be that the lengths of chain lying embedded in the road surface will tend to bow out, as indicated by the dotted lines at 20 in Fig. 1, and the hooks 11 will thereby be pulled into tight frictional engagement with the edges of the wheel rim, thereby preventing any further slip of the wheel. It will further be noted that although it is desirable to positively secure the free ends of the chain to the wheel rim, as by the bolt 19, such securing means will, in practice, carry little, if any, of the strain imposed upon the chain since, as described above, the chain automatically tightens itself so that each pair of hooks serves as a securing means when there is any tendency for the wheel to slip. The bolt 19 is therefore necessary, in substance, only as a means for preventing initial slipping of the wheel and to afford sufficient resistance to bow out the chain and permit the securing hooks 12 to be drawn into frictional engagement. A further advantage of my particular construction lies in the fact that as a wheel revolves there will be a continual slight creeping backward and forward or shaking of the chain, which will thereby serve to automatically prevent caking or clogging with mud. The loose chain thereby presents a great advantage over the fixed, grub-hooks, traction lugs, and other stationary members commonly used to assist traction in that the latter have an almost incurable tendency to clog themselves or fill up their interstices with a smooth body of mud, when traction conditions are particularly difficult.

While I have shown and described in considerable detail one specific embodiment of my invention, it is to be understood that such showing and description is illustrative only and for the purpose of making my invention more clear, and that I do not regard myself as limited to the details of construction as shown and described, except in so far as such limitations are included within the terms of the following claims in which it is my intention to claim all novelty inherent in the device as broadly as the prior art will permit.

What I claim as new and desire to secure by Letters Patent is:—

1. The combination with a wheel rim, of a plurality of securing means slidable along opposite edges of the rim, and a chain laced backward and forward from a securing means on one side to the opposite side and around the periphery of the wheel.

2. The combination with a wheel rim, of a plurality of U-shaped hooks loosely embracing the opposite edges of the rim and slidable therealong, and a chain laced backward and forward across the face of the rim and from a hook on one edge to a hook on the opposite edge and around the periphery of the wheel.

3. The combination with a wheel rim, of a plurality of hooks embracing and slidable along opposite edges of the rim and a chain laced backwardly and forwardly across the tread surface of the rim and from a hook on one edge to a hook on the opposite edge and around the periphery of the wheel, and means for securing the two ends of the chain to one another and to the wheel.

4. The combination with a tractor wheel having a flat tread surface, of a plurality of U-shaped hooks embracing opposite edges of the tread portion and slidable therealong, each hook having a chain-securing loop on its outer leg, a chain having some of its links secured in the said loops and laced backwardly and forwardly across the tread surface of the wheel and from a hook on one edge to a hook on the opposite edge, and around the periphery of the wheel, and means for securing the two ends of the chain to one another and to the wheel.

HARRY C. WAITE.

In presence of—
NELLIE B. DEARBORN,
F. M. RONDEAU.

Copies of this patent may be obtained for five cents each, by addressing the "Commissioner of Patents, Washington, D. C."